Sept. 6, 1949.   R. S. STADELHOFER   2,481,453

FISHING FLOAT

Filed May 15, 1947

Inventor
Richard S. Stadelhofer

By Clarence A. O'Brien
and Harvey B. Jacobson
Attorneys

Patented Sept. 6, 1949

2,481,453

UNITED STATES PATENT OFFICE 2,481,453

FISHING FLOAT

Richard S. Stadelhofer, Madison, Wis.

Application May 15, 1947, Serial No 748,185

1 Claim. (Cl. 43—15)

The present invention relates to new and useful improvements in fishing floats and more particularly to means carried by the float for setting the hook in the mouth of a fish when the fish strikes at the bait attached to the hook.

More specifically the invention embodies the provision of a spring retracted trip arm carried by the float and to which the fish hook is attached whereby upon a fish striking the hook the trip arm will be released to cause a jerk for setting the hook in the mouth of the fish.

An important object of the present invention is to provide a hook setting attachment of this character which is carried by the float and which will not interfere with the normal use thereof.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
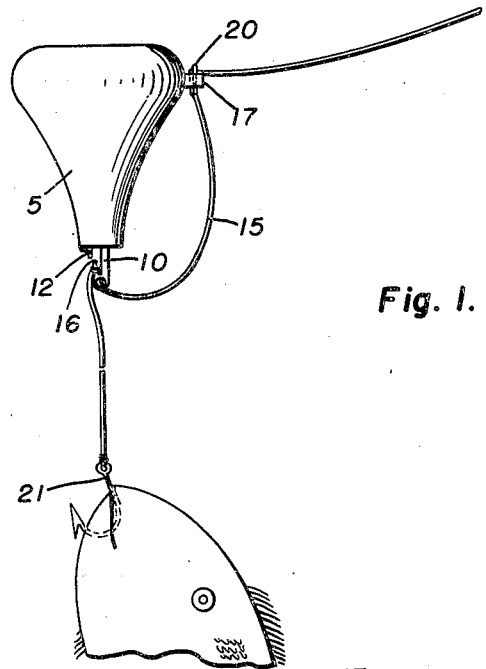
Figure 1 is a side elevational view showing the trip arm released for setting the hook.

Referring now to the drawings in detail wherein for the purpose of illustration, I have disclosed a preferred embodiment of the invention the numeral 5 designates the float body which may be constructed of cloth, wood or any other suitable material and of a suitable shape to ride in an upright position on the surface of the water.

A bore 6 extends vertically through the body of the float and is closed by a plate 7 at its upper end, the plate having a screw eye 8 attached to its underside and positioned in the upper end of the bore for attaching the upper end of a retractable coil spring 9 thereto, the spring extending downwardly in the bore 6.

A trip arm 10 is attached at its upper end to the lower end of the spring 9 and includes a laterally projecting shoulder 11 adjacent its upper end for engaging under an angular trip arm rest 12 secured to the lower end of the float by a screw or the like 13, the engagement of the shoulder 11 with the trip arm rest 12 holding the trip arm in a downwardly projecting set position.

Figure 2:
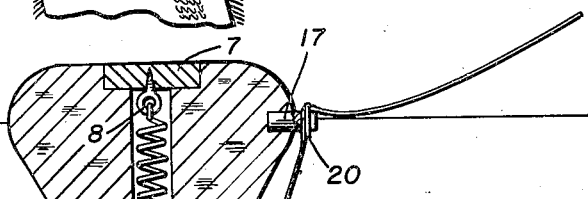
Figure 2 is an enlarged vertical sectional view.
Figure 3:
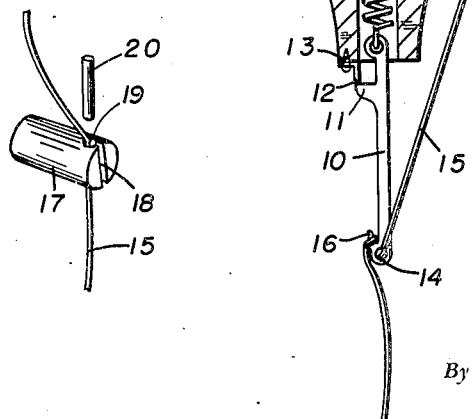
Figure 3 is a perspective view of the line attaching means carried by the float.

The lower end of the trip arm 10 is formed with an eye 14 for receiving a fish line 15, the line being held against sliding movement through the eye by attaching the line by means of a half hitch over an upstanding finger 16 formed at the lower portion of the trip arm adjacent the eye as shown in Figure 2 of the drawings.

A peg 17 is recessed in one side of the body of the float at the water line and projects laterally therefrom, the outer end of the peg being formed with a vertical slot 18 terminating in a vertical bore 19 at its inner end for receiving the line 15. The line is secured in the bore 19 by a wedge pin 20.

In the operation of the device the line 15 is inserted through the bore or opening 19 of the peg 17 at the upper portion of the float and is also attached to the lower end of the trip arm 10, sufficient slack being provided in the line to enable the trip arm 10 to be pulled downwardly below the float 5 against the tension of the spring 9 and secured in a downwardly projecting or set position by engaging the shoulder 11 with the trip arm rest 12 as shown in Figure 2 of the drawings.

The striking of a fish at the bait attached to the hook 21 at the lower end of the line will jerk the shoulder 11 of the trip arm free from the trip arm rest 12 whereupon the spring 9 will jerk the hook 21 quickly in an upward direction to thus set the hook in the fish's mouth.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to changes comprehended by the scope of the appended claim.

Having described my invention, what I claim as new is:

A fishing float having a vertical bore provided with a closed top, a normally contracted coil spring suspended in said bore with an upper end attached to said top, a bottom rest on said float at one side of said bore, a trip arm with a lateral shoulder and an upper end pivoted on the lower end of said spring whereby said arm may be pulled downwardly out of the float to tension said spring and then swung laterally on the spring to position the shoulder under the rest and hold said arm in tensioned position, said trip arm having a lower end eye, an upstanding finger on the lower end of said arm, a slotted side peg on said float with a wedge therein, and a line held by said wedge in the slot of said peg and extended through said eye and hitched around said finger for attachment of a hook thereto, whereby a fish biting on the hook will pull on the arm and release the shoulder from under the rest to permit the spring to jerk the arm upwardly and set the hook in a fish and whereby said line is adjustable along said float by removing the wedge and releasing said hitch.

RICHARD S. STADELHOFER.

REFERENCES CITED

The following references are of record in the file of this patent:

UNITED STATES PATENTS

| Number | Name | Date |
| --- | --- | --- |
| 283,444 | Wentworth | Aug. 21, 1883 |
| 542,917 | Bardsley | July 16, 1895 |
| 711,318 | Hymers | Oct. 14, 1902 |
| 751,734 | Hymers | Feb. 9, 1904 |
| 1,614,931 | Pennell | Jan. 18, 1927 |
| 1,989,407 | Ezell | Jan. 29, 1935 |
| 2,204,560 | Allison | June 18, 1940 |